US010523639B2

(12) United States Patent
Ekambaram et al.

(10) Patent No.: US 10,523,639 B2
(45) Date of Patent: Dec. 31, 2019

(54) PRIVACY PRESERVING WEARABLE COMPUTING DEVICE

(71) Applicant: INTERNATIONAL BUSINESS MACHINES CORPORATION, Armonk, NY (US)

(72) Inventors: Vijay Ekambaram, Tamilnadu (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 340 days.

(21) Appl. No.: 14/928,100

(22) Filed: Oct. 30, 2015

(65) Prior Publication Data
US 2017/0126630 A1 May 4, 2017

(51) Int. Cl.
*H04L 29/06* (2006.01)
*H04N 7/18* (2006.01)
(Continued)

(52) U.S. Cl.
CPC .......... *H04L 63/0428* (2013.01); *G06F 1/163* (2013.01); *H04L 63/102* (2013.01);
(Continued)

(58) Field of Classification Search
CPC . H04L 63/0428; H04L 63/102; H04L 63/107; H04N 7/185; G06F 1/163; H04W 12/02
See application file for complete search history.

(56) References Cited

U.S. PATENT DOCUMENTS

| 2008/0030588 | A1* | 2/2008 | Boss | H04N 5/23203 |
| | | | | 348/211.2 |
| 2014/0078164 | A1* | 3/2014 | Chan | G09G 5/30 |
| | | | | 345/589 |
| 2014/0140575 | A1* | 5/2014 | Wolf | G06K 9/3233 |
| | | | | 382/103 |

OTHER PUBLICATIONS

Yus et al., FaceBlock: Privacy-Aware Pitures for Google Glass; UMBC Ebiquity; http://ebiquity.umbc.edu/paper/html/id/652/FaceBlock-Privacy-Aware-Pictures-for-Google-Glass; Jun. 16, 2014; 2 pages.

(Continued)

*Primary Examiner* — Dave Czekaj
*Assistant Examiner* — Berteau Joisil
(74) *Attorney, Agent, or Firm* — William Hartwell; Andrew D. Wright; Roberts Mlotkowski Safran Cole & Calderon, P.C.

(57) ABSTRACT

A method implemented by a wearable computing device includes: receiving respective privacy preference packets from one or more user devices, each privacy preference packet indicating whether a user consents to have their picture taken by the wearable computing device; determining a field of view of the wearable computing device; determining particular user devices, of the one or more user devices, located within a range of coordinates corresponding to the field of view; determining whether at least one of the one or more user devices prevents the wearable computing device from capturing an image based on the privacy preference packets; preventing the image to be captured when the at least one of the one or more user devices prevents the wearable computing device from capturing the image; and permitting the image to be captured when all user devices located within a range of coordinates indicate consent to capture the image.

17 Claims, 9 Drawing Sheets

(51) Int. Cl.
*G06F 1/16* (2006.01)
*H04W 12/02* (2009.01)
*H04W 12/08* (2009.01)

(52) U.S. Cl.
CPC ........... *H04L 63/107* (2013.01); *H04N 7/185* (2013.01); *H04W 12/02* (2013.01); *H04W 12/08* (2013.01)

(56) References Cited

OTHER PUBLICATIONS

Wang et al., "InSight: Recognizing Humans without Face Recognition;" ACM HotMobile, vol. 13, Feb. 26-27, 2013; http://synrg.csl.illinois.edu/papers/insight-final.pdf; 6 pages.

Pappachan et al., "A Semantic Context-Aware Privacy Model for FaceBlock", University of Maryland, http://ebiquity.umbc.edu/_file_directory_/papers/714.pdf; Accessed Oct. 29, 2015; 9 pages.

Young, David G., "Beacon Transmission With Android 5.0", Radius Developers; http://developer.radiusnetworks.com/2014/11/18/beacon-transmission-with-android-5.html; Accessed Oct. 29, 2015; 2 pages.

Jung et al., "Distance Estimation of Smart Device Using Bluetooth", ThinkMind(TM) Digital Library; Jan. 30, 2013; http://www.thinkmind.org/index.php?view=article&articleid=icsnc_2013_1_30_20039; 2 pages.

* cited by examiner

PRIVACY PRESERVING WEARABLE COMPUTING DEVICE

BACKGROUND

The present invention generally relates to preventing images from being taken of users without their permission, and more particularly, preventing images from being taken of users using inconspicuous cameras integrated within wearable computing devices.

Wearable computing devices, such as eyeglasses with integrated displays and cameras, are convenient for quickly and easily capturing images. However, wearable computing devices can be used to capture images of individuals without their notice. For example, wearable computing devices include inconspicuous cameras integrated within the structure of the device, making it possible to discreetly capture an image of an unassuming individual. This is a substantial privacy concern, as many individuals would prefer not to have their pictures taken without their notice.

SUMMARY

In an aspect of the invention, a computer-implemented method includes: receiving, by a wearable computing device, respective privacy preference packets from one or more user devices, each privacy preference packet indicating whether a user consents to have their picture taken by the wearable computing device; determining, by the wearable computing device, a field of view of a camera device integrated with the wearable computing device; determining, by the wearable computing device, particular user devices of the one or more user devices, located within a range of coordinates corresponding to the field of view; determining, by the wearable computing device, whether at least one of the one or more user devices prevents the wearable computing device from capturing an image of the field of view based on the privacy preference packets received by the wearable computing device; preventing, by the wearable computing device, the image to be captured by the wearable computing device when the at least one of the one or more user devices prevents the wearable computing device from capturing the image; and permitting, by the wearable computing device, the image to be captured by the camera device when all user devices located within a range of coordinates indicate consent to capture the image.

In another aspect of the invention, there is a computer program product for enforcing image capture privacy settings. The computer program product includes a computer readable storage medium having program instructions embodied therewith. The program instructions are executable by a wearable computing device to cause the wearable computing device to: receive an instruction to capture an image using a camera device integrated in the wearable computing device; prior to capturing the image, determine whether the wearable computing device is permitted to capture the image based on respective privacy preference packets received from one or more user devices located within a range of coordinates corresponding to a field of view of the camera device, each respective privacy preference packet indicating whether a user consents to have their picture taken; capture the image when the privacy preference packets received from the one or more user devices within the field of view of the camera device permit the image to be captured; and refrain from capturing the image when at least one privacy preference packet received from at least one of the one or more user devices user device within the field of view of the camera device does not permit the image to be captured.

In another aspect of the invention, a system includes: a CPU, a computer readable memory and a computer readable storage medium associated with a user device; program instructions to output, to a wearable computing device, a privacy preference packet indicating a privacy setting of whether a user of the user device permits the wearable computing device to capture an image of the user. The wearable computing device is prevented from capturing the image of the user when the user device is located within a range of geographic coordinates within a field of view of the wearable computing device and when the privacy preference packet indicates that the user does not permit the wearable computing device to capture the image of the user. The wearable computing device is permitted to capturing the image of the user when the user device is located within a range of geographic coordinates within a field of view of the wearable computing device and when the privacy preference packet indicates that the user permits the wearable computing device to capture the image of the user. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to preventing images from being taken of users without their permission, and more particularly, preventing images from being taken of users using inconspicuous cameras integrated within wearable computing devices. In accordance with aspects of the present invention, a wearable computing device includes a privacy check component that determines whether a user has assented to have their picture taken before a picture is taken of that user.

As described herein, a user device includes a privacy companion component that communicates with the privacy check component to indicate whether the user of the user device permits a wearable computing device to capture an image of the user. The privacy companion component may periodically output a privacy preference packet to surrounding wearable computing devices and/or other user devices to indicate whether the user of the user device permits their image to be captured. If the user is within a field of view of a camera of the wearable computing device, and the privacy preference packet has indicated that the user permits their picture to be taken, then the wearable computing device will be free to capture the image. If, on the other hand, the user privacy preference packet has indicated that the user does not permit their picture to be taken, then the wearable computing device will be prevented from taking a picture of the individual. For example, software processes enabling an image capture function may be locked or disabled to cause the wearable computing device to refrain from taking a picture when an individual who has not permitted their picture to be taken is in the field of view of the wearable computing device.

As described herein, the wearable computing device may visually indicate to the user of the wearable computing device whether or not individuals in a field of view of the user have consented to have their images taken. This visual indication can assist the user of the wearable computing device to alter the field of view to those individuals who have permitted their picture to be taken.

As described herein, situations may arise in which a group of multiple individuals are within a field of view of a wearable computing device and particular individuals in the group may permit their pictures to be taken while others may not. In embodiments, upon determining that an individual prohibits their picture being taken, the wearable device sends a request message to a user device of that individual. The request message asks the user to assent to having their picture taken at this time. The users may either select to permit their pictures to be taken, or exit the field of view of the wearable computing device. Additionally, or alternatively, the user of the wearable computing device may alter the field of view of view so that individuals who have not permitted their pictures to be taken are no longer in the field of view of the wearable computing device.

As described herein, the wearable computing device may use location determination techniques to determine the location of nearby user devices, and map the location of the user devices to their privacy preferences. For example, the wearable computing device may use data from global positioning system (GPS) components of the user devices, a compass in the wearable device, signal strength data from the other user devices, and/or other information to determine "fine" or precise locations of nearby user devices. Based on determining the precise locations of the nearby user devices, the wearable computing device maps the privacy preferences to the user devices in order to determine the image capture privacy preferences for the user devices.

In some implementations, the user may define policies that permit particular wearable computing devices associated with particular individuals to capture their image, while denying other wearable computing devices associated with other individuals from capturing their image. For example, the user may define a "white list" of wearable computing devices that are consented to capture their image, while preventing other wearable computing devices, e.g., to permit friends and family to capture their image, while preventing strangers from capturing their image. Additionally, or alternatively, the user may define a blocked list that defines particular wearable computing devices that are prohibited from capturing their image. Additionally, or alternatively, the user may define policies that permit their image to be captured based on certain lighting conditions, or at particular times of day. For example, pixel-based classification techniques may be used to determine the lighting conditions, and the policies may define particular lighting conditions in which the user consents to have their picture taken.

In accordance with aspects of the present invention, the techniques described herein advantageously do not rely on facial recognition for protecting an individual's privacy in the context of capturing images of the individual (e.g., since facial recognition can be unreliable and/or inaccurate). Further, the techniques described herein do not require an individual's image to be stored on a cloud server, thereby further improving the individual's privacy.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Figure 1:
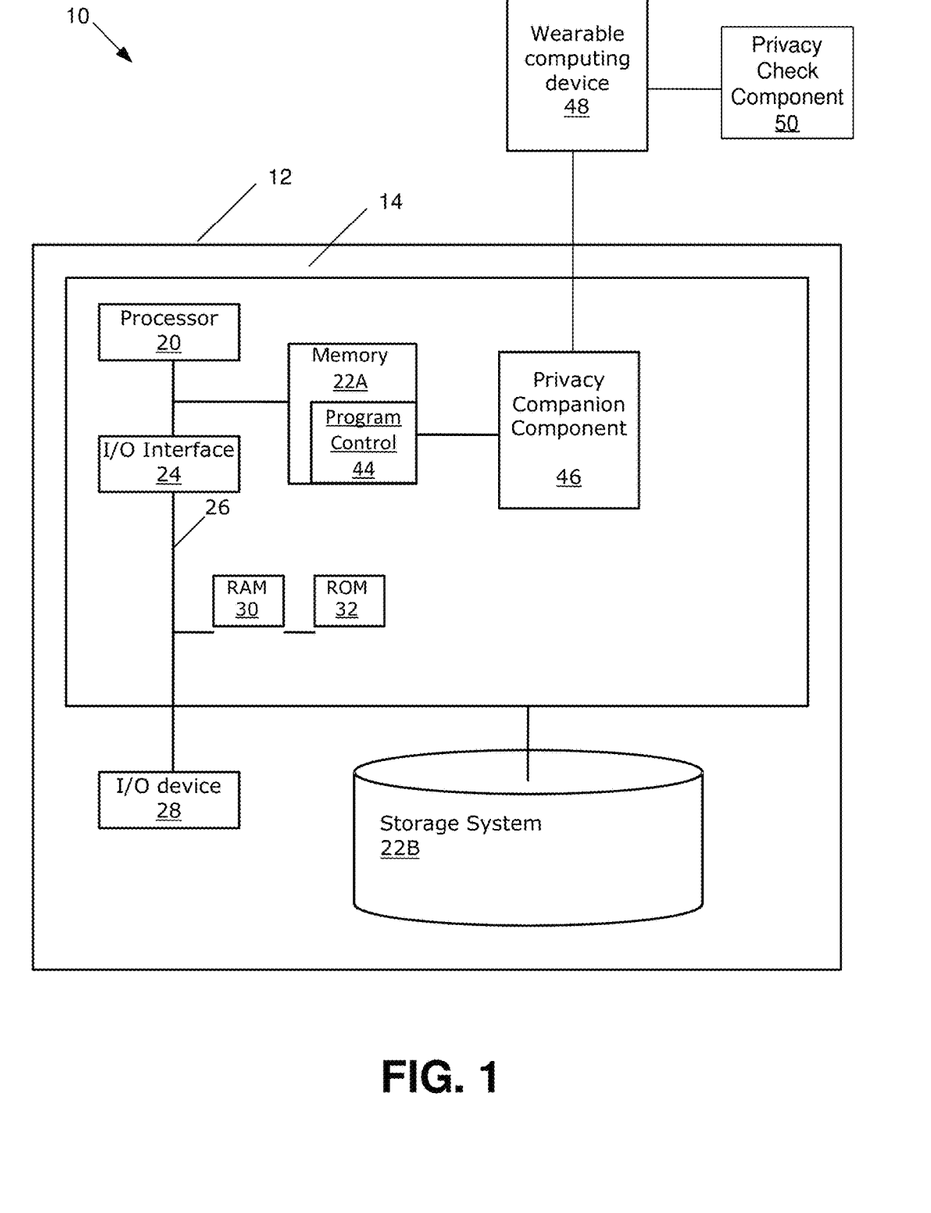
FIG. 1 depicts a computing environment according to an embodiment of the present invention.

FIG. 1 shows an illustrative environment 10 for managing the processes in accordance with the invention. To this extent, environment 10 includes a computing system 12 that can perform the processes described herein. In particular, system 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM) 30, a read-only memory (ROM) 32, and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a privacy companion component 46, e.g., the processes described herein. The privacy companion component 46 can be implemented as one or more program code in program control 44 stored in memory 22A as separate or combined modules. Additionally, the privacy companion component 46 may be implemented as separate dedicated processors or a single or several processors to provide the function of these tools. In embodiments, the privacy companion component 46 may communicate with a wearable computing device 48, e.g., a privacy check component 50 of the wearable computing device, to indicate the image capture privacy preferences of a user.

While executing the computer program code, the processor 20 can read and/or write data to/from memory 22A, storage system 22B, and/or I/O interface 24. The program code executes the processes of the invention. The bus 26 provides a communications link between each of the components in computing device 14.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, system 12 is only illustrative of various types of computer infrastructures for implementing the invention. For example, in embodiments, system 12 comprises two or more computing devices (e.g., a server cluster) that communicate over any type of communications link, such as a network, a shared memory, or the like, to perform the process described herein. Further, while performing the processes described herein, one or more computing devices on system 12 can communicate with one or more other computing devices external to system 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
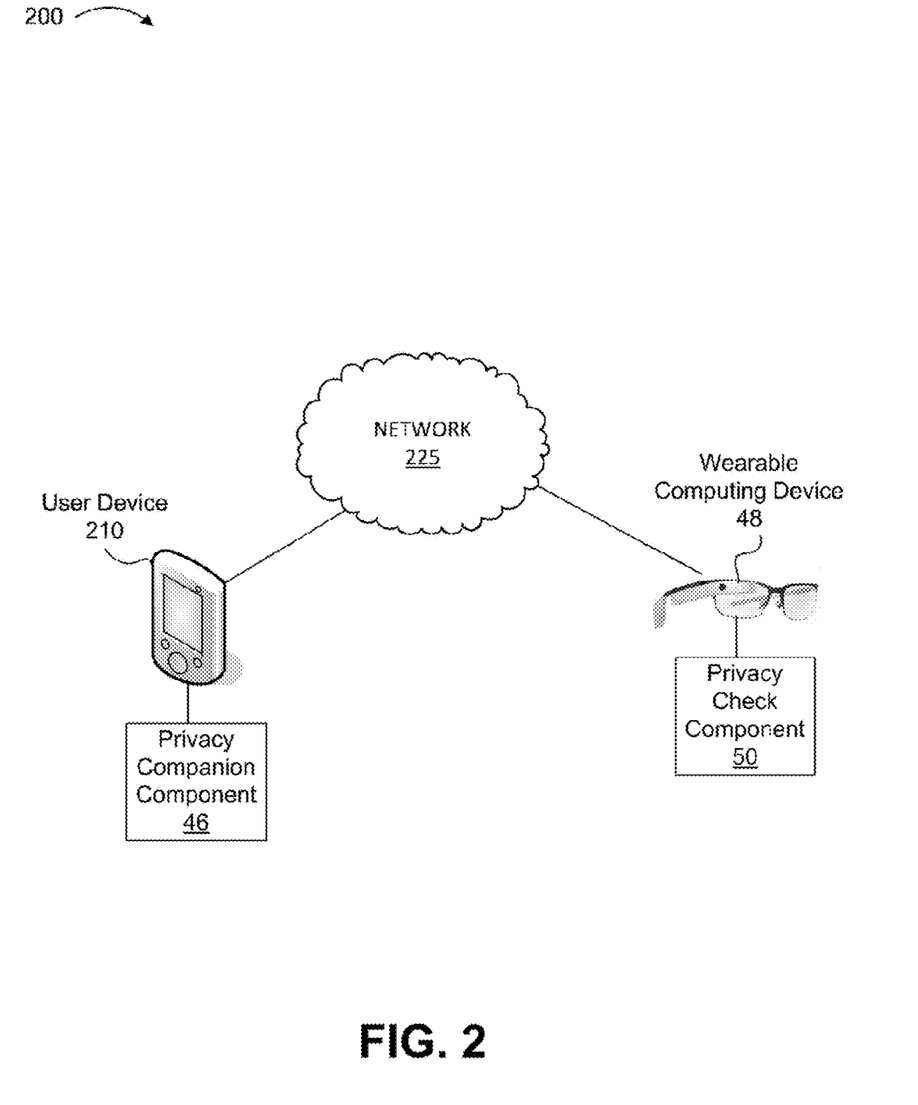
FIG. 2 shows an example environment in accordance with aspects of the present invention.

FIG. 2 shows an example environment in accordance with aspects of the present invention. As shown in FIG. 2, environment 200 may include a user device 210, a wearable computing device 48, and/or a network 225. In embodiments, one or more components in environment 200 may correspond to one or more components in the computing environment of FIG. 1. For example, the user device 210 may comprise a computing device such as computing device 14. Moreover, the user device 210 may include the privacy companion component 46.

The user device 210 may include a device capable of communicating via a network, such as the network 225. For example, the user device 210 may correspond to a mobile communication device (e.g., a smart phone or a personal digital assistant (PDA)), a portable computer device (e.g., a tablet computer), or another type of device. The user device 210 may include a privacy companion component 46 that outputs privacy image capture preference packets indicating whether the user permits their picture to be taken by a wearable computing device 48 (or even another user device 210).

The wearable computing device 48 may include a pair of eyeglasses having an integrated display and an integrated camera. The wearable computing device 48 may further include a privacy check component 50 that checks image capture privacy preference packets of nearby user devices 210 to determine whether the users of the user devices 210 permit their pictures to be taken. As described in greater detail herein, the privacy check component 50 may obtain the "fine" locations (e.g., precise locations within a few centimeters) of nearby user devices 210 and map the image capture privacy preferences to particular user devices 210 so that a user's image capture privacy preferences can be accurately implemented. In embodiments, the privacy check component 50 may be a mandate component implemented in a wearable computing device 48 in order to protect the privacy of individuals in regard to their pictures being taken.

The network 225 may include one or more network nodes. Additionally, or alternatively, the network 225 may include one or more wired and/or wireless networks. For example, the network 225 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 225 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. Additionally, or alternatively, the network 225 may include a Bluetooth network, a near-field communications (NFC) network, a beacon network, and/or other type of network.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
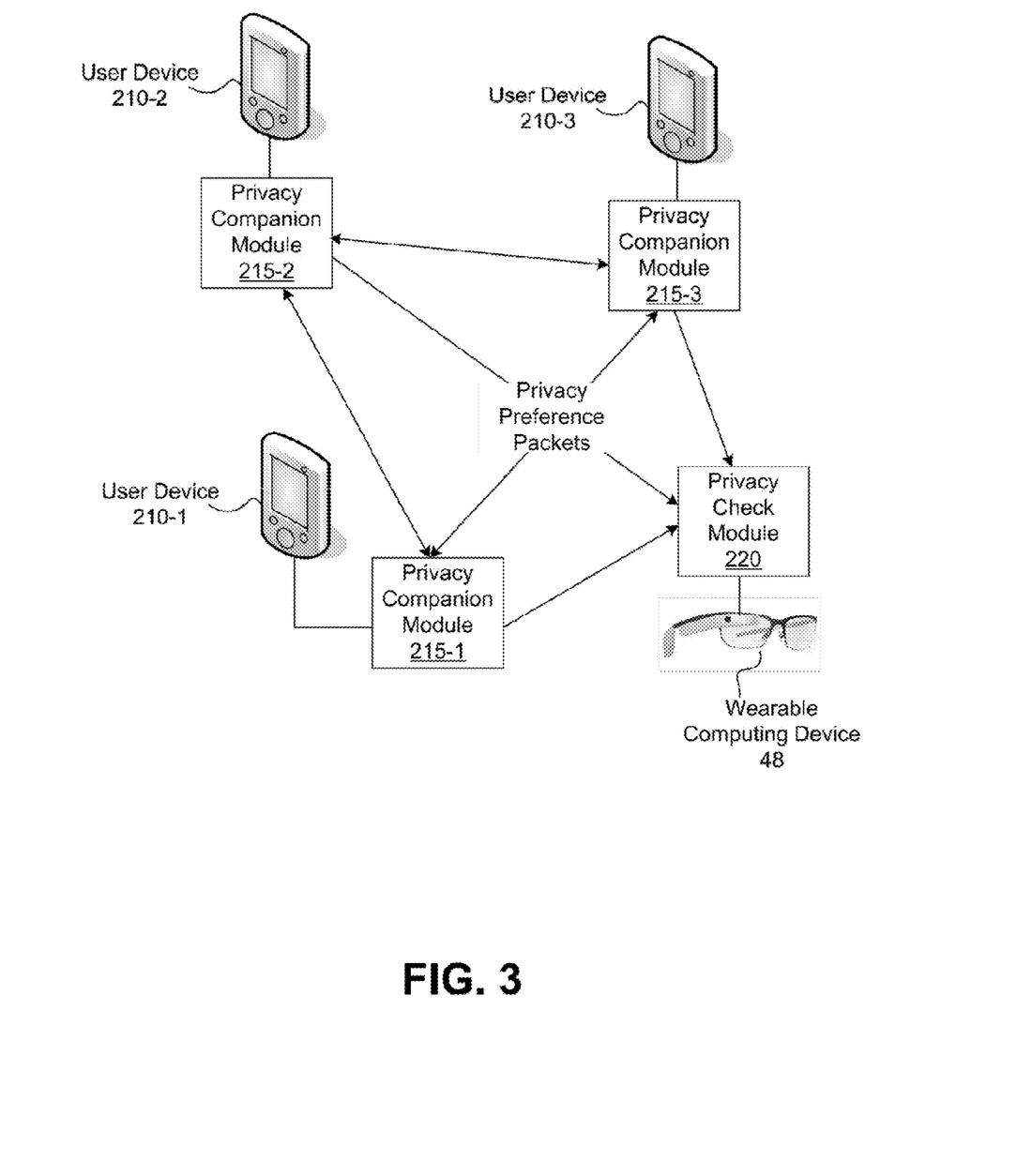
FIGS. 3-7 show an overview of an example implementation in accordance with aspects of the present invention.

FIGS. 3-7 show an overview of an example implementation in accordance with aspects of the present invention. As shown in FIG. 3, user devices 210-1, 210-2, and 210-3 each broadcast privacy preference packets to each other and to a wearable computing device 48. For example, each privacy companion component 46 of each user device 210 broadcasts the privacy preference packets indicating the image capture privacy preference of each individual user of the user devices 210-1, 210-2, and 210-3. In embodiments, the privacy preference packets are periodically and/or intermittently broadcast so that the wearable computing device 48 maintains the most current information regarding the privacy preferences of nearby user devices 210. In embodiments, each privacy preference packet may include an identifier of the user device 210 (e.g., an international mobile equipment identifier (IMEI), a subscriber identity module (SIM) card number, an integrated circuit card (ICC) identifier, and/or other identifier of the user device 210). Also, the privacy preference packet may include location information for the user device 210 (e.g., longitude/latitude coordinates). As described herein, the location of the user device 210 can be fine-tuned based on additional location information regarding the user device 210. For example, the location of the user device 210 can be fine-tuned based on signal strength data, relative location estimation techniques, cellular triangulation location data, location data from a nearby beacon, and/or other location data associated with the user device 210. In embodiments, the privacy check component 50 of the wearable computing device 48 may periodically or intermittently scan or search for broadcasted privacy preference packets using a short-range communications device, such as with Bluetooth hardware, NFC hardware, or the like.

Figure 4:
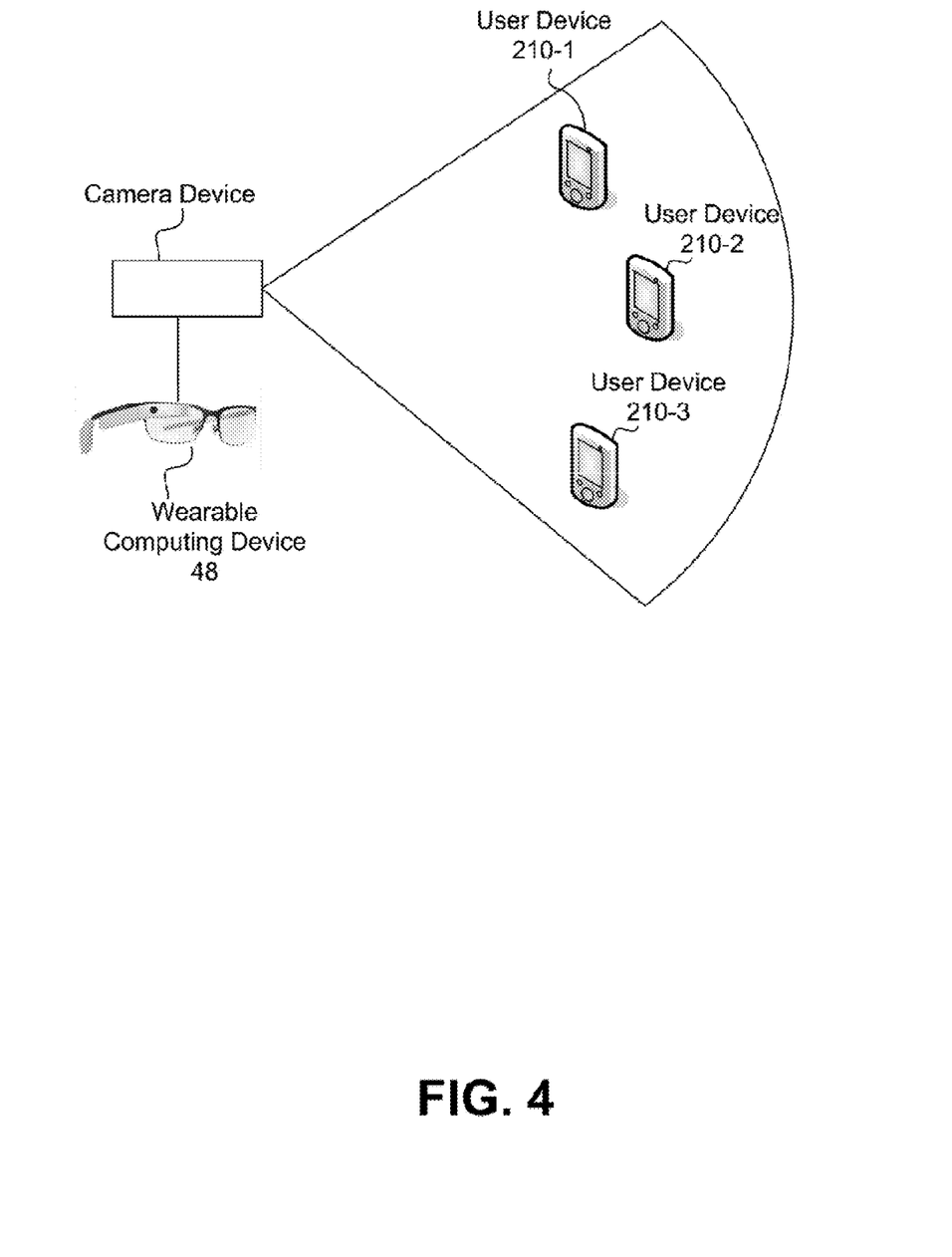

Referring to FIG. 4, the wearable computing device 48 may determine a field of view of a camera device integrated within the wearable computing device 48. In embodiments, the wearable computing device 48 may determine the field of view when receiving an instruction from the user of wearable computing device 48 to capture an image. Alternatively, the wearable computing device 48 may continuously track the field of view. The wearable computing device 48 may determine the locations of user devices 210 in relation to its field of view (e.g., the user devices 210-1, 210-2, 210-3 in the illustrative example of FIG. 4). For example, using GPS data of the wearable computing device and the user device 210, signal strength data of signals received from the user device 210 (e.g., Bluetooth signals, NFC signals, etc.), cellular triangulation location data, location data from a nearby beacon, location data from a WiFi direct network, and/or other location data associated with the user devices 210-1, 210-2, 210-3, the wearable computing device 48 determines the fine location of the user devices 210 for which the privacy check component 50 has received privacy preference packets. Using an integrated compass, the wearable computing device 48 can identify a direction in which the wearable computing device 48 is facing, and in combination with the precise locations of the user devices 210-1, 210-2, 210-3, the wearable computing device 48 may identify the user devices 210 that are located within in relation to field of view of the wearable computing device 48.

In embodiments, the wearable computing device 48 identifies that a user of a user device 210 is within the field of view of the wearable computing device 48 when the geographic location of user device 210 is within a range of geographic coordinates corresponding to the field of view of the wearable computing device 48. Thus, the wearable computing device 48 can determine that a user of a user device 210 is within a field of view of the wearable computing device 48 even if the user's user device 210 is not actually in a field of view of the wearable computing device 48 (e.g., if the user device 210 is in the user's pocket, bag, etc.).

Figure 5:
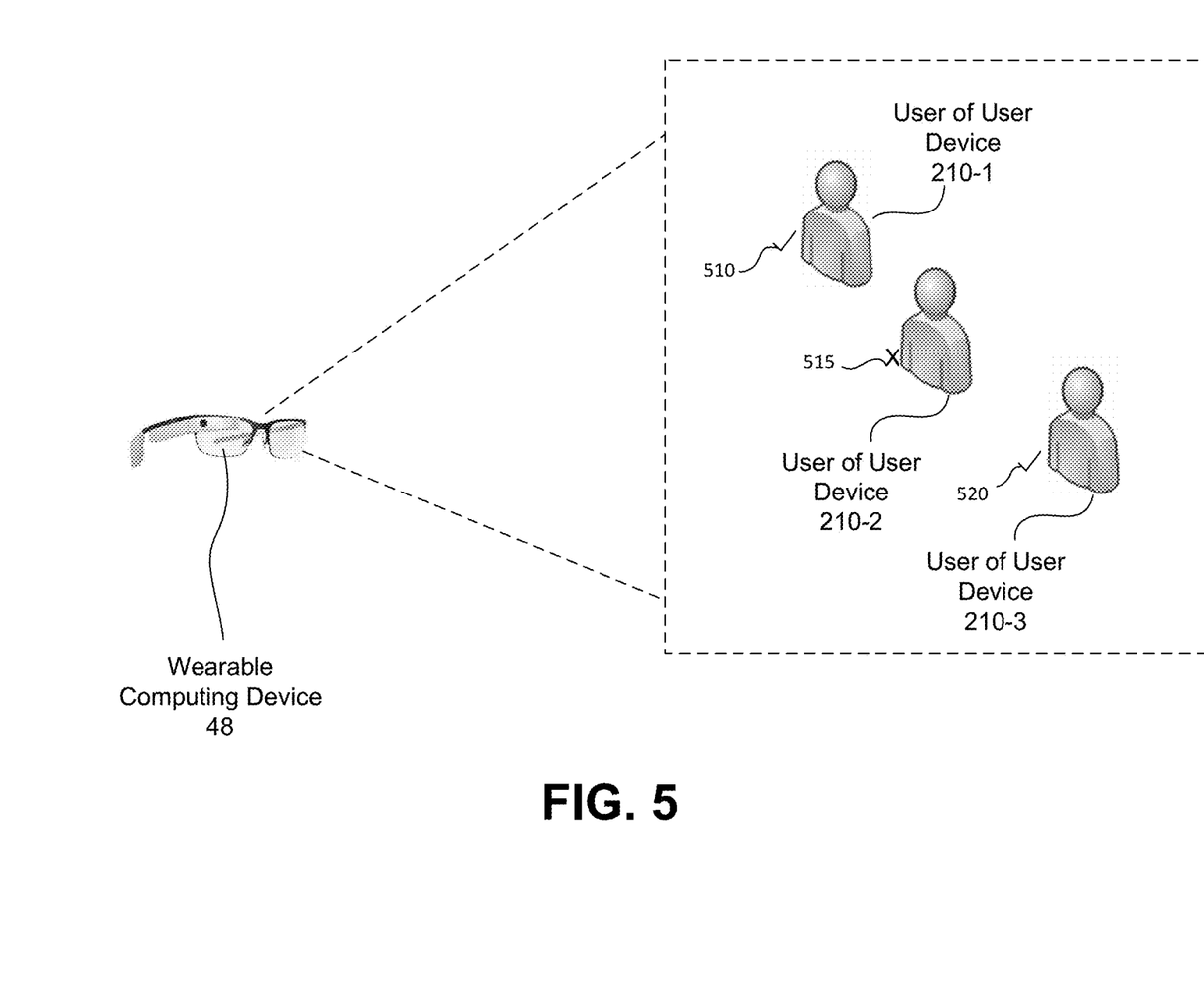

Referring to FIG. 5, the wearable computing device 48 may display a privacy preference indication identifying whether each individual in the field of view of wearable computing device 48 permits to have their picture taken. For example, the wearable computing device 48 may display the privacy preference indication based on the privacy preference packets previously received by the privacy check component 50, and based on the precise locations of the user devices 210—corresponding to the users. In the illustrative example of FIG. 5, the wearable computing device 48 may display or overlay checkmarks 510 and 520 next to users that consent to have their picture taken, and an "X" 515 next to those that do not. As an example, assume that the user of user device 210-1 and the user of user device 210-3 consent to have their pictures taken. Further, assume that the user of user device 210-2 does not consent to have their pictures taken. Given these assumptions, the wearable computing device 48 may display checkmarks 510 and 520 next to the users of user devices 210-1 and 210-3, and display an "X" 515 next to the user of user device 210-2. As described herein, the wearable computing device 48 refrains from capturing an image when the field of view of the wearable computing device 48 includes at least one individual who has not consented to having their picture taken. In embodiments, other indications can be used to indicate the user's privacy preference/setting. For example, a red icon can indicate that the user does not permit their picture to be taken, whereas a green icon indicates that the user permits their picture to be taken.

Figure 6:
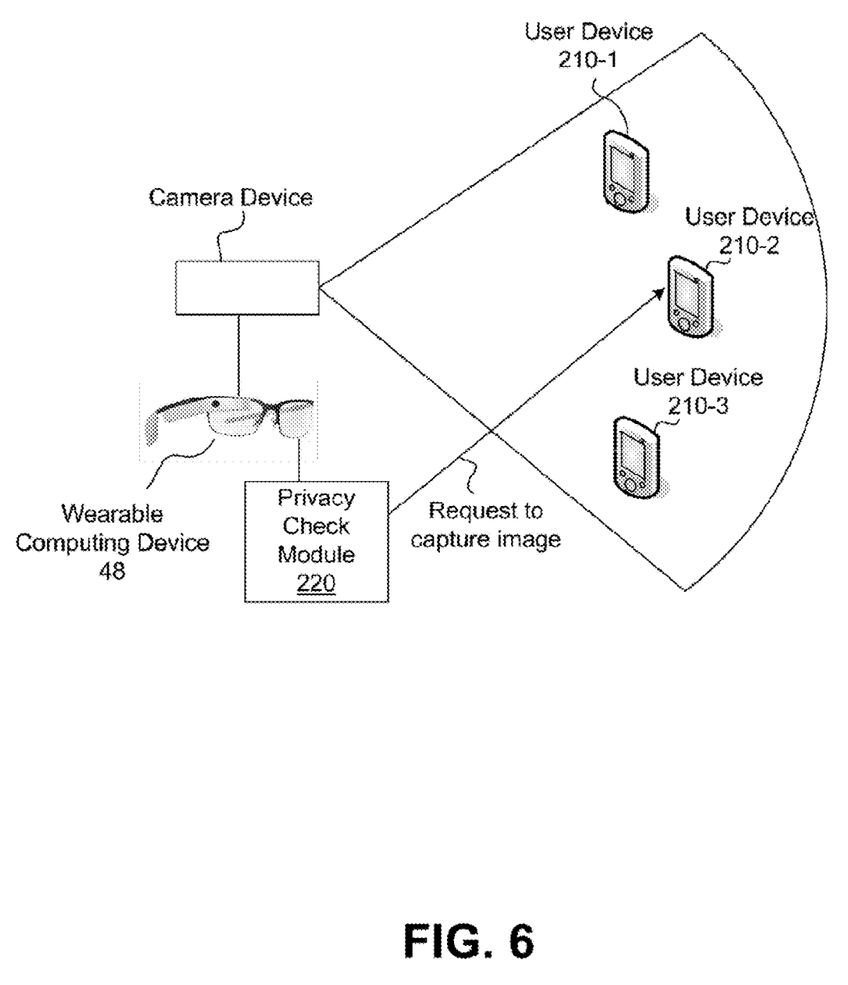

Referring to FIG. 6, and continuing with the above example, the privacy check component 50 may send a request message to the user device 210-2 wherein the request message asks permission for a picture to be taken by the wearable computing device 48 (i.e., to capture an image of the user of user device 210-2). For example, the privacy check component 50 may output this request message when the user of wearable computing device 48 has instructed wearable computing device 48 to capture an image while the user of user device 210-2 is in the field of view. This request message may also serve as a notification that the wearable computing device 48 is set to take a picture of the user, or is attempting to take a picture of the user.

In embodiments, the user device 210-2 may display an indication of the request message, and may present an option to the user to accept or deny the request. In embodiments, the user of the user device 210-2 can respond to the request message using gestures and/or by simply selecting a response on the display of the user device 210-2. If the request is accepted, the user device 210-2 may output an updated privacy preference packet that indicates that the user has permitted their image to be taken by the wearable computing device 48. In embodiments, this permission to take the user's picture may be a short-term or temporary permission, and may only permit a particular wearable computing device 48 to take the user's picture. In embodiments, the user device 210 may vibrate or provide haptic feedback when another user is attempting to take their picture (e.g., when the user device 210 receives a request to take the picture).

In an alternative embodiment, a user who is being photographed by a wearable computing device 48 may themselves be wearing their own wearable computing device 48. In this situation, the wearable computing device 48 of the user being photographed can broadcast a privacy preference packet to indicate whether or not the user permits their picture to be taken. The user can also use their wearable computing device 48 to respond to a request to have their picture taken. For example, the wearable computing device 48 of the user being photographed can include sensors to detect a series of eye blinks or winks. The series of eye blinks or winks can be translated by the wearable computing device 48 as an acceptance or rejection message to accept or deny a request to have the user's picture taken. For example, winking the left eye twice followed by the right eye once can be translated into an acceptance message (e.g., an updated privacy preference packet permitting the user's picture to be taken) to accept a request to have the user's picture taken.

Figure 7:
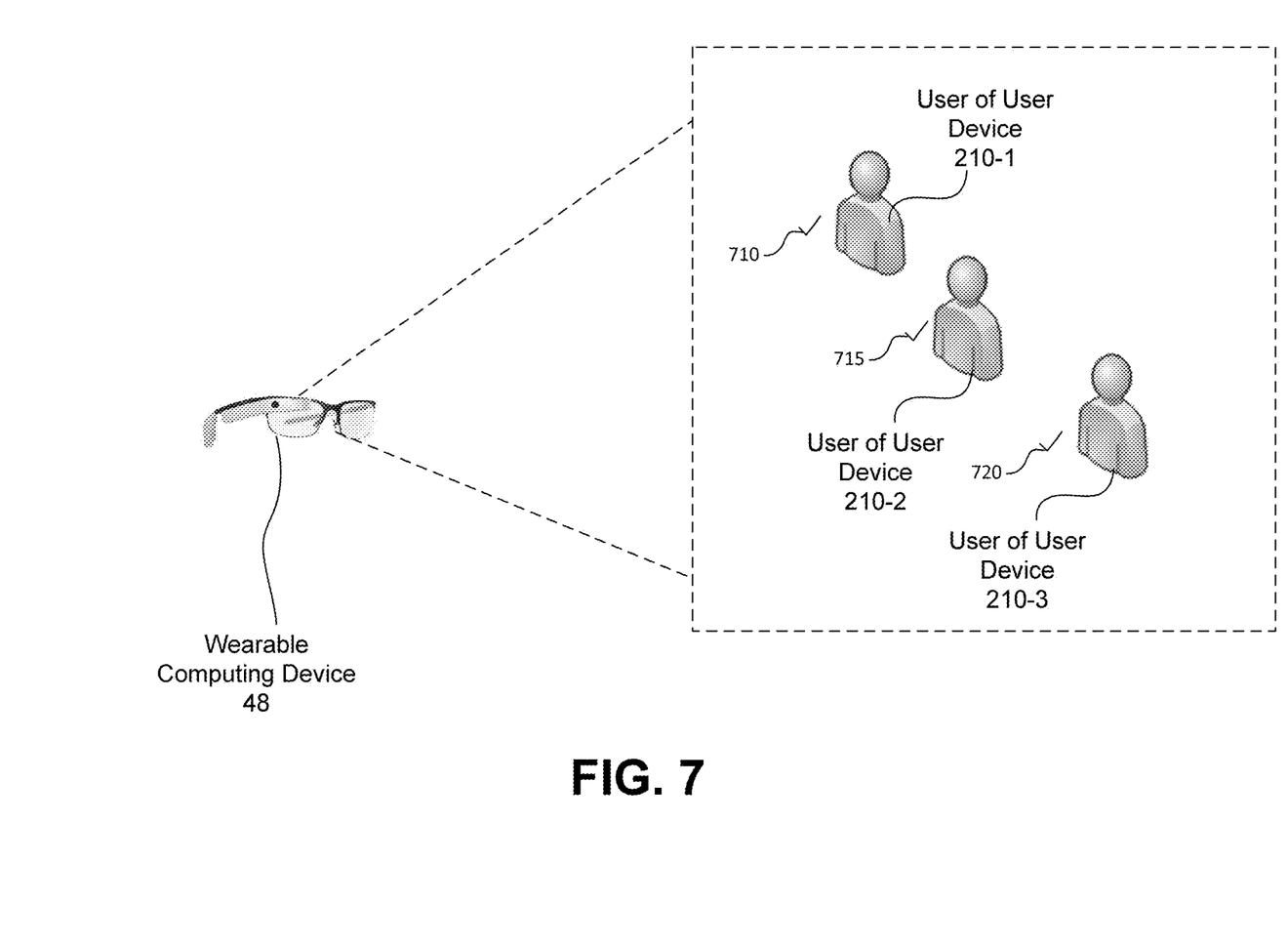

Referring to FIG. 7, and continuing with the above example, the wearable computing device 48 may display a checkmark 715 next to the user of user device 210-2 (e.g., assuming that the user of user device 210-2 has given their permission to have their picture taken, in response to receiving the request for permission as described in FIG. 6). Since all the users of the user devices 210 within the field of view of the wearable computing device 48 have consented to have their pictures taken, the wearable computing device 48 is now free to take the picture.

Figure 8:
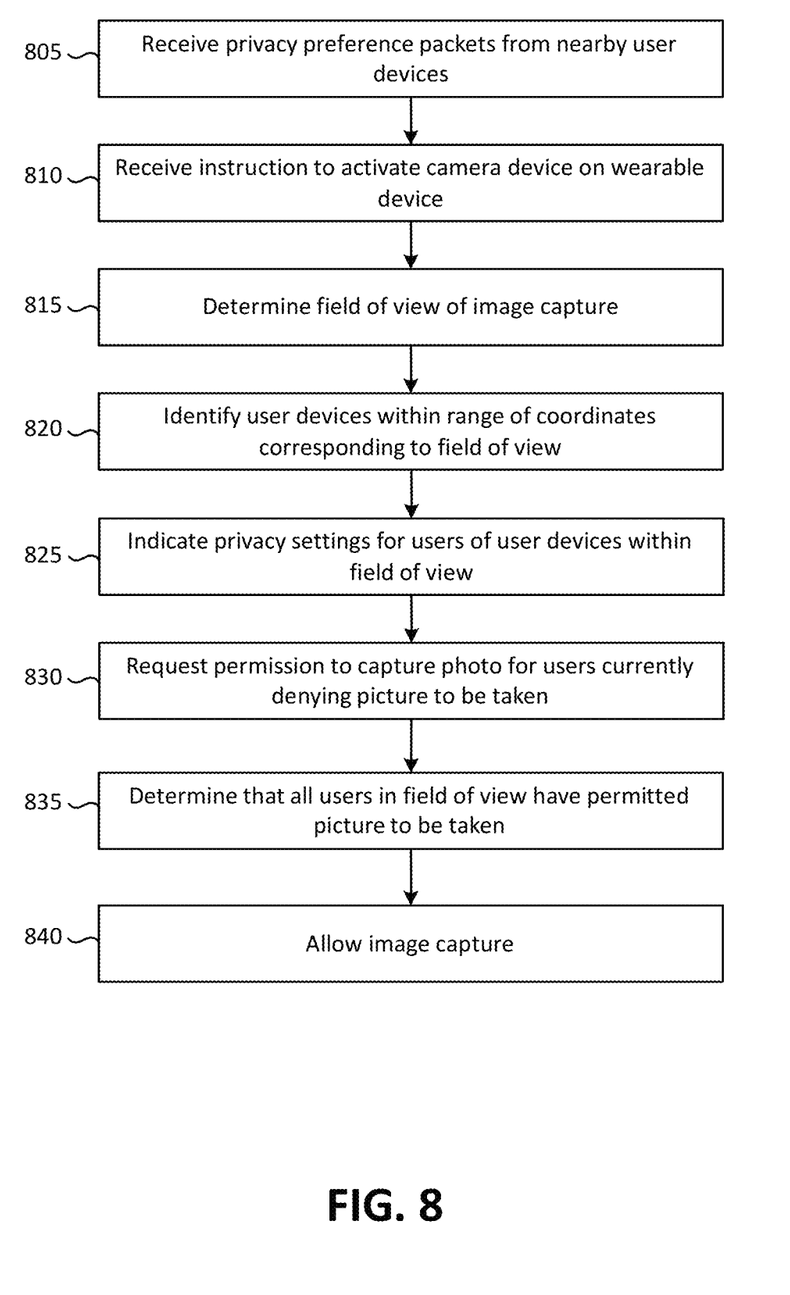
FIG. 8 shows an example flowchart for concealing sensitive content, and permitting an authorized user to view the sensitive content through a wearable device registered to an authorized user in accordance with aspects of the present invention.

FIG. 8 shows an example flowchart for enforcing image capture privacy settings for users. The steps of FIG. 8 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

At step 805, privacy preference packets from nearby user devices 210 are received by the wearable computing device 48. For example, the privacy check component 50 of the wearable computing device 48 may receive the privacy preference packets from nearby user devices 210 when the user devices 210 are within a particular range of the privacy check component 50. For example, a user device 210 may send a privacy preference packet when the user device 210 is within Bluetooth range of the wearable computing device 48. In embodiments, the user device 210 may periodically send the privacy preference packet each time the user's location changes and/or when a policy change occurs (e.g., when the user updates permissions to permit or revoke permission for taking the user's picture). In embodiments, the user device 210 may broadcast the privacy preference packet using any number of communication channels and/or radios, such as Bluetooth, infrared, radio frequency, etc. At step 810, an instruction is received to activate the camera device on a wearable device. For example, the privacy check component 50 may receive an instruction from the user of the wearable computing device 48 to activate the camera device, e.g., to capture an image using the wearable computing device 48.

At step 815, the field of view of the image capture is determined. For example, the privacy check component 50 may determine the field of view using an integrated compass and information identifying a focal length of the camera device of the wearable computing device 48. In embodiments, the privacy check component 50 may identify a range of coordinates corresponding to the field of view. The range of coordinates is based on the location of the wearable computing device 48 and the field of view of the wearable computing device 48.

At step 820, user devices 210 within the range of coordinates corresponding to the field of view are identified. For example, the privacy check component 50 may compare the location coordinates of the user devices 210 for which privacy packets were received with the range of coordinates corresponding to the field of view. As described above, the privacy check component 50 may determine the location coordinates for the user devices 210 based on location information included in the privacy preference packets, and/or other location data used to fine-tune the location of the user devices 210.

At step 825, the privacy settings for users of user devices within the field of view are indicated. For example, the privacy check component 50 may provide information to a display process of the wearable computing device 48 to indicate whether users in the field of view permit their pictures to be taken based on the privacy settings packets for the user devices 210 associated with each user. In embodiments, while the camera device is focusing, the focusing time can be used to tag the privacy settings for each user in the field of view.

At step 830, permission is requested to capture a photo for users currently denying their picture to be taken. For example, the privacy check component 50 may send a request message to those user devices 210 who have sent privacy preference packets indicating that the users have not consented to have their picture taken. As described above, the user device 210 may display the request, and may present an option to the user to accept or deny the request. In embodiments, the permission to take the user's picture may be a short-term or temporary permission, and may only permit a particular wearable computing device 48 to take the user's picture.

At step 835, a determination is made that all the users in the field of view have permitted their picture to be taken. For example, the privacy check component 50 may determine that all the users in the field of view have permitted their picture to be taken. In embodiments, this determination is made when users who previously denied their pictures to be taken accept a request for their picture to be taken. Additionally, or alternatively, the determination is made when a user who does not wish to have their picture taken exits from the field of view of the wearable computing device 48. Additionally, or alternatively, the determination is made when a user of the wearable computing device 48 alters the field of view such that those users who not with to have their picture taken are no longer in the field of view.

At step 840, the image capturing is allowed (e.g., the picture is taken) by the camera device of wearable computing device 48. Thus, an image is captured only when all users in the field of view of the wearable computing device 48 have given their permission to have their picture taken.

In embodiments, the displayed indications of privacy settings can be updated in real-time as the field of view changes (e.g., as the user of the wearable computing device 48 alters the direction in which they point the wearable computing device 48 when wearing the wearable computing device 48). Additionally, or alternatively, the displayed indications of privacy settings can be updated as users of the user devices 210 update their privacy preferences.

In embodiments, steps 825 and 830 may be omitted if all users within a field of view of the wearable computing device 48 have consented to have their pictures taken. That is, there is no need to request users to have their images taken if their privacy settings have permitted their picture to be taken.

Figure 9:
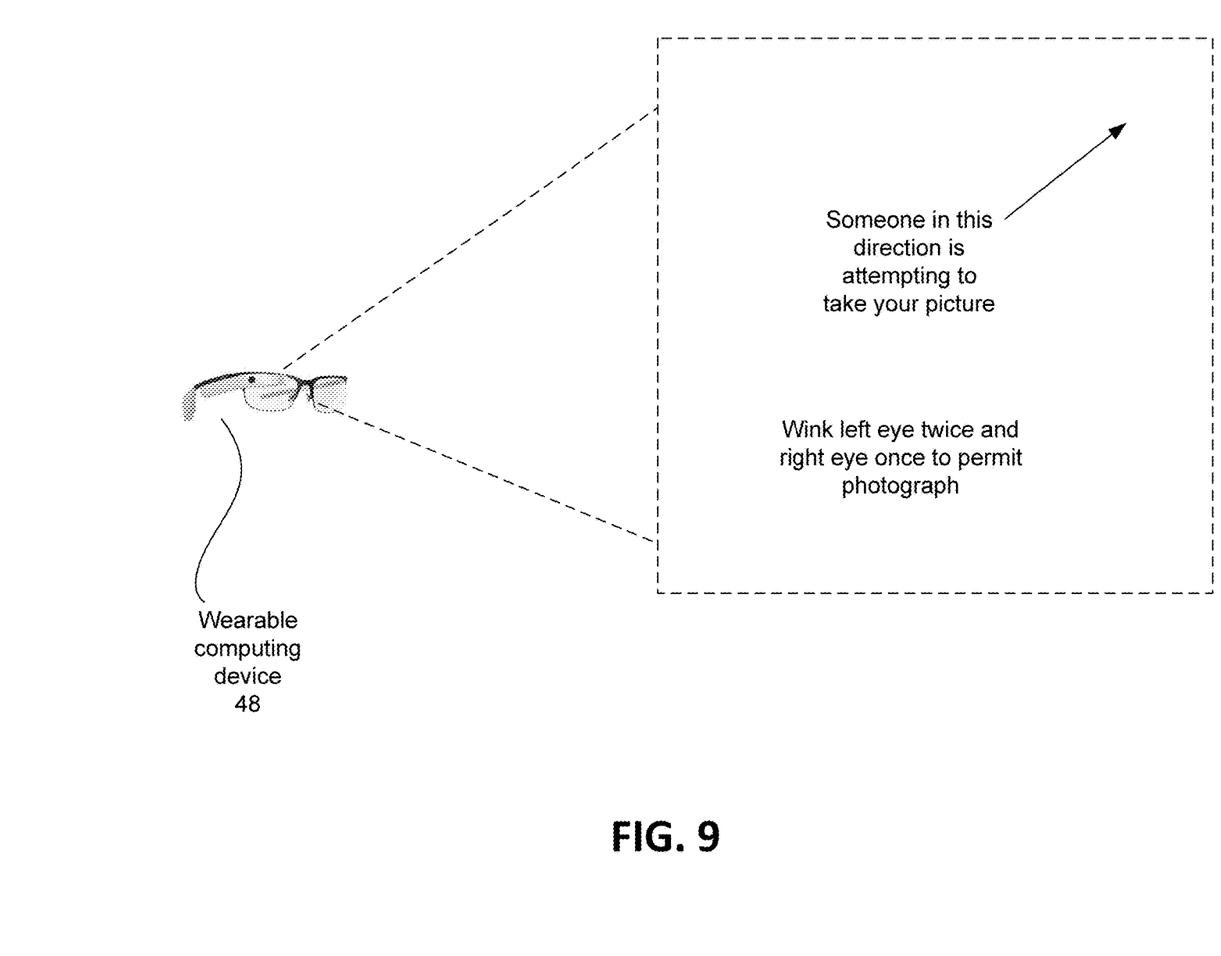
FIG. 9 shows an implementation for notifying a user when a device is attempting to capture their image.

FIG. 9 illustrates an example of an alternative embodiment in accordance with aspects of the present invention. In FIG. 9, wearable computing device 48 may indicate to a user that another user is attempting to take their picture (e.g., using a different wearable computing device 48). The wearable computing device 48 of the user in FIG. 9 may indicate the direction of the wearable computing device 48 attempting to take their picture. For example, the wearable computing device 48 attempting to take the picture may send a request to capture the image of the user of FIG. 9. The request may identify the location of the wearable computing device 48 attempting to take the picture. The user of the wearable computing device 48 in FIG. 9 can respond to the request using a series of blinks and/or winks, as shown.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for enforcing image capture privacy settings, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a wearable computing device, respective privacy preference packets from one or more user devices, each privacy preference packet indicating whether a user consents to have their picture taken by the wearable computing device;

determining, by the wearable computing device, a field of view of a camera device integrated with the wearable computing device;

determining, by the wearable computing device, particular user devices of the one or more user devices located within a range of coordinates corresponding to the field of view;

determining, by the wearable computing device, whether at least one of the one or more user devices prevents the wearable computing device from capturing an image of the field of view based on the privacy preference packets received by the wearable computing device;

preventing, by the wearable computing device, the image to be captured by the wearable computing device by disabling an image capture function on the wearable computing device when the at least one of the one or more user devices prevents the wearable computing device from capturing the image;

permitting, by the wearable computing device, the image to be captured by the camera device when all user devices located within the range of coordinates indicate consent to capture the image based on the respective privacy preference packets of all the user devices located within the range of coordinates requesting, by the wearable computing device, user devices that prevent the wearable computing device to capture the image for permission to capture the image;

receiving, by the wearable computing device, permission to capture the image from the user devices; and permitting, by the wearable computing device, the image to be captured by the wearable computing device based on receiving the permission to capture the image.

2. The method of claim 1, wherein the determining the field of view includes determining the field of view using a compass device associated with the wearable computing device.

3. The method of claim 1, wherein the field of view is based on a focal length of the camera device.

4. The method of claim 1, wherein:

the privacy preference packets include location information for the one or more user devices; and the determining the particular user devices of the one or more user devices located within the range of coordinates corresponding to the field of view is based on the location information included in the privacy preference packets.

5. The method of claim 1, further comprising determining the location of the one or more user devices based on at least one selected from the group consisting of:

signal strength data;
cellular triangulation location data; and
location data from a beacon, wherein the determining the particular user devices of the one or more user devices located within the range of coordinates corresponding to the field of view is based on determining the location of the one or more user devices.

6. The method of claim 1, further comprising displaying, within an integrated display of the wearable computing device, an indication of users that have consented to have the image captured based on the privacy preference packets received by the wearable computing device.

7. The method of claim 1, wherein the determining the particular user devices of the one or more user devices located within the range coordinates corresponding to the field of view is based on receiving an instruction to activate the camera device on the wearable computing device.

8. The method of claim 1, further comprising notifying users within the field of view that the image is set to be captured; and sending a query to any of the user devices preventing the wearable computer device from capturing the image, the query including a request to assent to being included in the image to be captured.

9. A computer program product for enforcing image capture privacy settings, the computer program product comprising a computer readable storage medium having program instructions embodied therewith, the program instructions executable by a wearable computing device to cause the wearable computing device to:

receive an instruction to capture an image using a camera device integrated in the wearable computing device;

prior to capturing the image, determine whether the wearable computing device is permitted to capture the image based on respective privacy preference packets received from one or more user devices located within a range of coordinates corresponding to a field of view of the camera device, each respective privacy preference packet indicating whether a user consents to have their picture taken;

capture the image when the privacy preference packets received from the one or more user devices within the field of view of the camera device permit the image to be captured;

refrain from capturing the image by disabling an image capture function on the wearable computing device when at least one privacy preference packet received from at least one user device of the one or more user devices within the field of view of the camera device does not permit the image to be captured;

request user devices that prevent the wearable computing device to capture the image for permission to capture the image;

receive permission to capture the image from the user devices that prevent the wearable computing device to capture the image; and capture the image by the wearable computing device based on receiving the permission to capture the image.

10. The computer program product of claim 9, wherein the program instructions further cause the wearable computing device to:

determine that the one or more user devices are located within the range of coordinates corresponding to the field of view based on location information included in the privacy preference packets.

11. The computer program product of claim 9, wherein the program instructions further cause the wearable computing device to determine the location of the one or more user devices based on at least one selected from the group consisting of:
   signal strength data;
   cellular triangulation location data; and
   location data from a beacon,
   wherein determining whether the wearable computing device is permitted to capture the image is based on determining the location of the one or more user devices.

12. The computer program product of claim 9, wherein the program instructions further cause the wearable computing device to display, within an integrated display of the wearable computing device, an indication of users that have consented to have the image captured based on the privacy preference packets received by the wearable computing device.

13. The computer program product of claim 9, wherein the program instructions further cause the wearable computing device to notify users within the field of view that the image is set to be captured.

14. A system comprising:
   a CPU, a computer readable memory and a computer readable storage medium associated with a user device;
   program instructions to output, to a wearable computing device, a privacy preference packet indicating a privacy setting of whether a user of the user device permits the wearable computing device to capture an image of the user,
   wherein the wearable computing device is prevented from capturing the image of the user when the user device is located within a range of geographic coordinates within a field of view of the wearable computing device by disabling an image capture function on the wearable computing device and when the privacy preference packet indicates that the user does not permit the wearable computing device to capture the image of the user,
   wherein the wearable computing device is permitted to capturing the image of the user when the user device is located within a range of geographic coordinates within a field of view of the wearable computing device and when the privacy preference packet indicates that the user permits the wearable computing device to capture the image of the user,
   wherein when the user device prevents the wearable computing device from capturing the image, the user device receives a request for permission from the wearable computing device to capture the image, and
   wherein the program instructions are stored on the computer readable storage medium for execution by the CPU via the computer readable memory.

15. The system of claim 14, further comprising program instructions to receive a notification from the wearable computing device when the wearable computing device is attempting to capture an image of the user.

16. The system of claim 14, wherein the user device is another wearable computing device, the system further comprising:
   program instructions to translate a series of eye blinks into a response to the request for permission; and
   program instructions to output the response to the request.

17. The system of claim 14, wherein the privacy setting is based on at least one selected from the group consisting of:
   an identifier of the wearable computing device;
   a location;
   a time of day; and
   lighting conditions.

* * * * *